United States Patent [19]

Krone et al.

[11] Patent Number: 4,937,032
[45] Date of Patent: Jun. 26, 1990

[54] METHOD FOR MOLDING A COMPOSITE WITH AN INTEGRALLY MOLDED RIB

[75] Inventors: James R. Krone; John H. Barber, both of Bartlesville, Okla.

[73] Assignee: Phillips Petroleum Company, Bartlesville, Okla.

[21] Appl. No.: 201,133

[22] Filed: May 31, 1988

[51] Int. Cl.⁵ .............................................. B29C 43/14
[52] U.S. Cl. ..................... 264/255; 264/258; 264/259; 156/62.2; 156/296; 156/242
[58] Field of Search ............ 264/255, 258, 108, 259; 425/123, 125; 156/296, 62.2, 242

[56] References Cited

U.S. PATENT DOCUMENTS

| | | |
|---|---|---|
| 3,033,707 | 5/1962 | Lacy et al. ........................ 428/215 |
| 3,354,129 | 11/1967 | Edmonds, Jr. et al. ............ 528/265 |
| 3,449,482 | 6/1969 | Mitchell ............................ 264/257 |
| 3,724,803 | 4/1973 | Goldfarb ........................... 249/102 |
| 3,844,862 | 10/1974 | Sauer et al. ....................... 156/78 |
| 3,903,343 | 9/1975 | Pfaff ................................ 264/255 |
| 3,923,951 | 12/1975 | Pukszta, Jr. ...................... 264/250 |
| 3,962,511 | 6/1976 | Foti .................................. 428/246 |
| 4,023,801 | 5/1977 | Van Auken ....................... 428/109 |
| 4,035,543 | 7/1977 | Draper et al. .................... 428/245 |
| 4,051,290 | 9/1977 | Jutte ................................. 264/255 |
| 4,123,488 | 10/1978 | Lawson ............................ 264/135 |
| 4,127,713 | 11/1978 | Campbell .......................... 528/391 |
| 4,172,175 | 10/1979 | Pearson et al. ................... 428/376 |
| 4,269,884 | 5/1981 | Della Vecchia et al. .......... 428/131 |
| 4,271,116 | 6/1981 | Jones ................................ 264/221 |
| 4,294,639 | 10/1981 | Woelfel ............................. 264/258 |
| 4,353,857 | 10/1982 | Ray .................................. 264/258 |
| 4,385,955 | 5/1983 | Doerfling ......................... 156/245 |
| 4,425,384 | 1/1984 | Brownscombe ................... 427/221 |
| 4,443,507 | 4/1984 | Yamada et al. .................. 428/114 |
| 4,446,191 | 5/1984 | Miyadera et al. ................. 428/245 |
| 4,451,317 | 5/1984 | Oizumi et al. .................... 156/247 |
| 4,522,875 | 6/1985 | Still, Jr. et al. .................. 428/285 |
| 4,530,147 | 7/1985 | Mattel et al. ..................... 156/297 |
| 4,532,097 | 7/1985 | Daniels ............................. 264/258 |
| 4,544,701 | 10/1985 | Walker et al. .................... 264/257 |
| 4,556,529 | 12/1985 | Muser et al. ..................... 264/258 |
| 4,603,071 | 7/1986 | Wehnert et al. .................. 428/112 |
| 4,622,192 | 11/1986 | Ma .................................... 264/136 |
| 4,636,422 | 1/1987 | Harris .............................. 428/174 |
| 4,645,565 | 2/1987 | Vallee et al. ..................... 162/123 |
| 4,680,224 | 7/1987 | O'Connor ......................... 428/294 |
| 4,716,212 | 12/1987 | Gaughan .......................... 528/226 |

FOREIGN PATENT DOCUMENTS

| | | | |
|---|---|---|---|
| 0057719 | 4/1984 | Japan ............................... | 264/108 |
| 1043542 | 3/1986 | Japan . | |
| 2251568 | 11/1987 | Japan ............................... | 264/108 |
| 2098123 | 11/1982 | United Kingdom . | |

OTHER PUBLICATIONS

Composite Materials Handbook, M. M. Schwartz, McGraw-Hill, pp. 2.12.–2.15, 4.79, 4.80; Mar. 7, 1984.
Encyclopedia of Polymer Science & Engineering, vol. 6, John Wiley & Sons, pp. 94–131, 12-11-86.
Encyclopedia of Chemical Technology, 3rd Ed., vol. 9, pp. 118–137; 7-14-80.

Primary Examiner—Jay H. Woo
Assistant Examiner—Jeremiah F. Durkin, II
Attorney, Agent, or Firm—Richmond, Phillips, Hitchcock & Umphlett

[57] ABSTRACT

A technique is provided for both forming frame portions from thermoplastic resin prepregs containing randomly arranged reinforcing fibers directly at predetermined location(s) upon a preformed wall portion and simultaneously bonding such as formed frame portions directly to such wall portion at such location(s). The wall portion is itself a laminate derived from thermoplastic resin prepregs containing ordered, substantially continuous reinforcing fibers.

10 Claims, 4 Drawing Sheets

METHOD FOR MOLDING A COMPOSITE WITH AN INTEGRALLY MOLDED RIB

BACKGROUND

1. Field of the Invention

This invention lies in the field of manufactured articles comprised of fiber reinforced engineering resin laminated composites, and includes apparatus and methods for making such articles from preformed prepregs.

2. Prior Art

In the art of composites, it is common to prepare prepregs of so-called engineering resins and reinforcing fibers. From the prepregs, composites (including laminated composites) are prepared.

To fabricate composites from prepregs, various forming techniques can be used, such as a so-called stamp molding procedure or the like, the techniques typically employing elevated temperatures and pressures. The art of fabricating composites from prepregs is relatively young and is characterized by unsolved fabrication problems. A problem has existed, for example, in forming three-dimensional, integral one-piece composite structures which are comprised of two different types of starting prepregs, a first type being identified herein as a first prepreg type which comprises a resin layer generally uniformly impregnated with an arrangement of substantially continuously extending ordered fibers, in a form such as a woven fabric, or a unidirectionally arranged array of spaced, parallel continuous fibers, and a second type being identified herein as a second prepreg type which comprises a resin layer generally uniformly impregnated with substantially randomly arranged reinforcing fibers, in a form such as a fiber mat, or randomly dispersed chopped fibers. The first such type of prepreg is well suited for use in the manufacture of flattened components to be used as wall portions or other similar flattened members, while the second such type of prepreg is well suited for use in the manufacture of three dimensional components to be used as frame or supporting portions or other similar projecting members. Such three-dimensional components preferably have a base portion that is securable to such a wall portion and also one or more integrally formed raised or projecting and upstanding portions, such as rib, frame, and support members, brackets, flanges, projections, platforms, and the like.

The principle reason for the differences in suitability between these respective first and second prepreg types arises out of the circumstance that the first such type of prepreg is difficult to mold into three dimensional members incorporating a major raised projection because ordered continuous reinforcing fibers in a prepreg are found to be difficult to stretch or elongate to an extent such as may be necessary to produce a product composite having undamaged fiber reinforcement in a projecting portion (depending, of course, somewhat upon the location and height of the raised portion relative to the adjacent surrounding base regions). However, in a prepreg, such as one of the second type containing a randomly arranged mat of fibers, there is a demonstrated capacity under the application of heat and pressure for both resin and reinforcing fiber to move transversely in a base region and outwardly away from the base region along with the impregnating resin, thereby permitting production of a product composite having a desired three dimensional structure which is substantially fully fiber reinforced.

A two-step composite manufacturing procedure, where, for example, a composite wall component is fabricated in one operation or step, and composite frame components (for supporting and rigidifying the wall component) are fabricated in another operation or step, and then the resulting respective components are somehow adhesively bonded or mechanically fastened together, is generally objectionable. For one thing, it is difficult to get a close fit between two such separately fabricated different composite components. Because of the rigidity and strength characteristically associated with composite components at ambient temperatures and pressures, fits and fit adjustments are difficult to achieve. For another thing, the surface characteristics of fabricated composite components make it difficult to adhesively bond such together using, for example, an adhesive substance which is applied between interfacially contacted component surfaces in a separate step after component fabrication. For another thing, the toughness of the respective separately fabricated components makes it difficult, and also time and labor consuming, to fasten such securely together by mechanical means, such as by rivets, nut and bolt assemblies, or the like.

The art of composite manufacture needs an improved technique for making integrated composite structures incorporating both above-indicated first and second types of fiber reinforced prepreg structures wherein each type is used to make respective component portions for which it is best suited.

SUMMARY OF THE INVENTION

One object of the present invention is to provide a new and very useful molding process of the stamp molding type for fabricating integrally associated single-piece laminated composite structures incorporating two different preqreg types with each respective prepreg type being utilized to form a composite structure for which it is well suited, a first such prepreg type being used for forming flattened wall portions and being impregnated with spatially ordered continuous reinforcing fibers, and a second such prepreg type being used for forming raised or three-dimensional frame portions and being impregnated with randomly arranged reinforcing fibers, both such prepreg types utilizing a high-performance, thermoplastic resin as the matrix phase.

Another object of the present invention is to provide a new and useful class of multiple component mold structures adapted for use in the fabrication of single-piece, integrally-formed, laminated composite structures having both wall portions and frame portions, with each such respective such portion incorporating a different type of preform.

Another object of the present invention is to provide a new and improved class of single-piece, integrally-formed, three-dimensional laminated structural composite, made from prepregs incorporating a high-performance thermoplastic resin matrix and reinforcing fibers. In such composite, the wall portions are derived from fiber reinforced preforms that incorporate ordered continuous reinforcing fibers, while the frame portions are derived from fiber-reinforced preforms that incorporate randomly arranged reinforcing fibers.

Other and further objects, aims, purposes, features, advantages, embodiments, and the like will be apparent to those skilled in the art from the teachings of the present specification, taken with the associated drawings, and the appended claims.

More particularly, in one aspect, the present invention relates a molding process for manufacturing an integrally formed laminated structural composite from two different types of prepregs both comprised of fiber reinforced, high-performance thermoplastic resin, a first such prepreg type incorporating an ordered arrangement or pattern comprised substantially of continuous reinforcing fibers, and a second such prepreg type incorporating a random arrangement of reinforcing fibers which can be continuous or not, wherein wall portions of the laminated structural composite are pre-formed and derived from such first prepreg type, while frame portions of the laminated structural composite are derived from such second prepreg type but are produced (formed) and bonded to the wall portion in a single operation. By using such process, manufacturing of such a laminated structural composite is accomplishable in two successive molding procedures (one to make the wall portion, and another for forming and bonding the frame portion) without the use of any auxiliary adhesive means, and without the use of any auxiliary mechanical fastening means.

In another aspect, the present invention relates to three-component mold structures which are useful in the practice of the composite formation process above characterized.

In another aspect, the present invention relates to a class of integrally formed, molded, laminated structural composites which characteristically incorporate two different types of prepregs, both prepreg types being comprised of fiber reinforced, high-performance thermoplastic resin. A first such prepreg type incorporates ordered continuous reinforcing fibers, while a second such prepreg type incorporates randomly arranged reinforcing fibers. Composite wall portions are derived from such first prepreg type, while composite frame portions are derived from the such second prepreg type. Such structural composites are produced by using the above indicated molding process and mold structures.

DETAILED DESCRIPTION

PREPREGS

Figure 1:
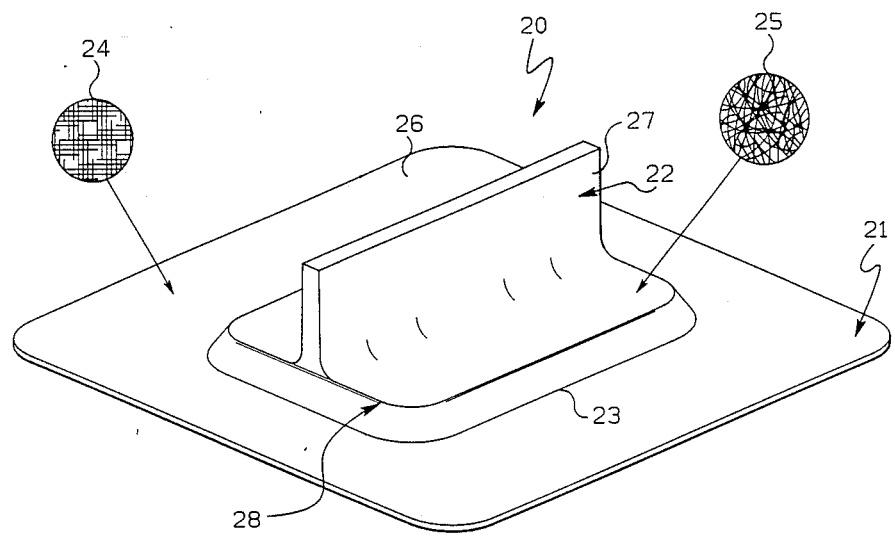
FIG. 1 is an isometric view of one embodiment of a laminated structural composite of the present invention.

For present purposes, a prepreg can be regarded as a fiber reinforced, self-supporting, heat and pressure processable layer comprising an engineering resin. Such layer is in a sheet, film, ribbon, or like physical form wherein reinforcing fibers associated with such resin are themselves in various physical forms, such as a woven fabric, a non-woven web or mat, unidirectionally arranged monofilaments, yarns, roving, chopped fiber, pulp, spun-laced sheet, wet-laid paper, and the like. As indicated above, physical properties in product composites in sheet or laminated form are generally improved and even maximized by using continuous fibers which are systematically arranged or ordered in the starting prepregs, such as unidirectional or woven reinforcing fibers. Also, as indicated above, moldability of a starting prepreg directly into a three dimensional fiber reinforced object is enhanced by using starting prepregs wherein the fiber is randomly ordered. Conventionally, and in general, the quantity of total fiber in a prepreg ranges from about 10 to 90 weight percent, while the quantity of thermoplastic resin ranges inversely from about 90 to 10 weight percent (on a 100 weight percent total prepreg basis). Various techniques are known for making prepregs of fiber reinforced high-performance thermoplastic resins.

As those skilled in art will readily appreciate, any known prepreg forming method can be utilized in the preparation of the respective first and second prepregs used as starting materials in the practice of the invention. In general, the known methods are adaptable for use in making both types of prepregs. Examples of suitable methods include, but are not limited to, (a) a slurry (usually aqueous) impregnation procedure for making stackable sheets such as disclosed in Still et al U.S. Pat. No. 4,522,875, (b) a pultrusion process such as disclosed in O'Connor U.S. Pat. No. 4,680,224, (c) a compaction belt method such as disclosed in Ma U.S. Pat. No. 4,622,192, and (d) an extrusion compacting roller process such as disclosed in Della Vecchia et al U.S. Pat. No. 4,269,884, and the like.

Thermoplastic Resins

The thermoplastic resins that are suitable for use in the practice of the present invention conform generally to the definition of "engineering plastics" provided by the Kirk-Othmer Encyclopedia of Chemical Technology (3rd ed., Vol. 9, Wiley-Interscience, New York, 1980, P118).

In terms of properties, engineering plastics have a good balance of high tensile properties, stiffness, compressive and shear strength, as well as impact resistance, and they are easily moldable. Their high physical strength properties are reproducible and predictable, and they retrain their physical and electrical properties over a wide range of environment conditions (heat, cold, chemicals). They can resist mechanical stress for long periods of time.

acetal resins,
polyamides,
polyimides,
polyamide imides
polyether imides
polyethers,
polyesters, polycarbonates,
polyarylene sulfides
polysulfones, such as polyarylsulfones
polyketones,
and the like. Any one of such respective generic resins can include in its backbone structure other linking moieties that join together repeating units besides the linking moiety designated in its name. As a consequence, the distinctions between different generic resins can become indistinct, as those skilled in the art readily appreciate.

For example, in the case of polyethers, residues of various starting monomers can be linked with non-ether linking groups and such other moieties when present produce various recognized polyether polymer classes, such as polyarylethers (really an all-ether linked polymer), polyether ketones, polyetherether ketones, polyether diketones, polyether sulfones, polyether imides, and the like. Polyarylethers are available commercially, for example, from the du Pont Company under its trademark "ARALON", and from the Amoco Performance Products Co. under the trademark "RADEL C". Polyether ketones (sometimes known as "PEK") are commercially available from ICI Americas under its "VICTREX" trademark, from BASF under its trademark "ULTRAPEK," and from Hoechst under its trademark "HOSTATEC". Polyetherether ketones (sometimes known as "PEEK") are available commercially, for example, from ICI Americas under its "VICTREX" trademark. Polyether diketones (sometimes known as "PEKK") are believed to be available commercially from the du Pont Company (trademark or tradename presently unknown). Polyether sulfones (sometimes known as PES) are commercially available from ICI Americas under its "VICTREX" trademark, and are believed to be available commercially from the Amoco Performance Products Company under its trademark "RADEL X." Polyether imides (sometimes known as "PEI") are believed to be available commercially from the General Electric Company under its trademark "ULTEM."

For another example, in the case of polyarylene sulfides, various starting monomers and various non-sulfide linking groups can be involved. When, for example, polyarylene sulfides (sometimes known as "PAS") are considered, various polymer classes can be identified, such as polyphenylene sulfide (sometimes known as "PPS"), polyarylene sulfide ketone (sometimes known as "PASK"), polyarylene sulfide sulfone (sometimes known as "PASS"), poly biphenylene sulfide (sometimes known as "PBPS"), and the like. Characteristically, a polyarylene sulfide polymer contains a plurality of units (which can be considered to be repeating units but which may not be in adjacent relationship to one another in a polymer backbone chain) of the formula:

—S—Ar— where "S" is a divalent sulfur atom, and "Ar" is a residue from an aromatic starting monomer of the formula:

X—Ar—X where "X" is a halogen selected from the group consisting of chlorine, fluorine, bromine and iodine, and where "Ar" is selected from the group comprising:

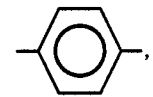

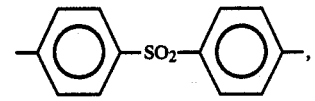

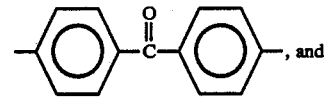, and

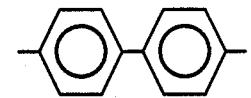

Polyphenylene sulfide resins are available from Phillips 66 Company under the trademark "RYTON." Polyarylene sulfide ketone resins can be prepared by the teachings of Gaughan U.S. Pat. No. 4,716,212. Polyarylene sulfide sulfone resins can be prepared by the teachings of Campbell U.S. Pat. No. 4,127,713. Poly binphenylene sulfide and other polysulfide resins can be prepared by the teachings of Edmonds, Jr. and Hill, Jr. in U.S. Pat. No. 3,354,129. Polyarylene sulfides are preferred thermoplastics for use in the practice of this invention.

Polyimides are available commercially, for example, from the duPont Company under its tradename J 2.

Polyamides are available commercially, for example, from the duPont Company under its tradenames K II and K III, and from the Mitsui Company under the trademark "LARC TPI."

Polyamide imides (sometimes known as "PAIs") are commercially available, for example, from Amoco Performance Products under the trademarks "TORLON" and AI-10.

Polyketones are available commercially, for example, from the Amoco Company under its tradename HTX (believed to be a polyarylene ketone).

Polysulfones are available commercially, for example, from Amoco Performance Products, Inc. under the trademark "UDEL."

Polyarylsulfones are available commercially, for example, from Amoco Performance Products, Inc. under the trademarks RADEL and ARDEL.

Thermoplastic polyesters include (a) terephthalate polyesters, such as polyethylene terephthalate (sometimes known as PET), polypropylene terephthalate (sometimes known as PBT), copolymers thereof, and mixtures thereof, (b) liquid crystal polyesters, and the like. Polybutylene terephthalate is available commercially, for example, from the General Electric Company under the trademark VALOX. Polyethylene terephthalate is available commercially, for example, from Goodyear Tire and Rubber Co. under the trademark CLEARTUF. Reinforced polyethylene terephthalate is available from such companies as du Pont (trademark: RYNITE), Allied-Signal (trademark: PETRA), Hoechst Celanese (trademark: IMPET), General Electric (trademark: VALOX), Mobay (trademark: PETLON), Thermofil, and Wilson Fiberfil (trademark: TETRAFIL). Liquid crystal thermoplastic polyesters (sometimes known as "LCPs") are available from Dartco Manufacturing under the trademark XYDAR, and from Hoechst Celanese Corp. under the trademark VECTRA.

Alloys and blends of such thermoplastic resins can be used in the practice of the present invention provided the blend or alloy has performance characteristics as above indicated for an "engineering plastic."Typically, such a blend or alloy contains at least 2 of such thermoplastic resins each present in a total concentration greater than about 5 weight percent (on a 100 weight percent total alloy or blend basis excluding fiber reinforcement). The principal reason for blending or alloying is to improve the resin cost/performance for a specific end use application, as those skilled in the art appreciate. Specific parameters that may be improved by alloying include, for examples, impact, lubricity, chemical resistance, weatherability, heat, strength, flow, melt strength, and tear resistance. Alloys and blends are conventionally prepared by mixing two or more polymers together in a molten state. Sometimes an alloy can be prepared by two different thermoplastic resins only one of which has properties satisfying the "engineering plastic" definition above given; even so, the alloy can have properties satisfying such definition. Such alloys are suitable for use in the practice of this invention.

Examples of suitable alloys for use in the practice of this invention include ABS/polyamide, ABS/polyvinyl chloride/thermoplastic polyester (where "ABS" refers to copolymers of styrene, butadiene, and acrylonitrile, usually discrete polybutadiene particles dispersed in a glassy matrix of styrene and acrylonitrile copolymer), acetal/elastomer alloys, such as those available from the du Pont Company commercially, polycarbonate/polybutylene terephthalate alloys, and polycarbonate/polyethylene terephthalate alloys, especially those which also contain one or more elastomers; polybutylene terephthalate/polyethylene terephthalate alloys; polymeric elastomer alloys with polyethylene terephthalate and/or polybutylene terephthalate; polyethylene terephthalate/polysulfone alloys (especially those which are reinforced with fibers, such as glass or the like), polyphenylene ether/high-impact polystyrene alloys (where high-impact polystyrene (or HIPS) comprises a thermoplastic resin produced from styrene monomer with elastomers, commonly polybutadiene, being introduced into the polymer matrix); polyphenylene ether/polyamide alloys; polyphenylene sulfide/polytetrafluoroethylene alloys; and the like.

As those skilled in the art appreciate, virtually all commercially available thermoplastic materials include additives, such as lubricants, stabilizers, fillers, fiber reinforcement agents, impact modifiers, flame retardants, colorants, anti-microbial agents, and the like. The usage of such additives is intended to produce in a particular thermoplastic resin system an optimum property combination and/or process profile for specific applications. For example, most impact modifiers known or available commercially are polymeric in nature, but preferred impact modifiers for use in the practice of this invention are thermoplastic and have performance characteristics as above indicated for an "engineering plastic."So-called engineering thermoplastic elastomers (sometimes termed ETEs) which also have such performance characteristics can, for example, be incorporated into a starting resin blend or alloy for use in the practice of this invention. Like the suitable thermoplastic resins above characterized and illustrated, ETEs are suitable for use under conditions of high load and creep potential, and have a broad service-temperature range, and are resistant to chemicals. Copolyester elastomers are most common and are preferred. Copolyester resins are available commercially from the du Pont Company under the trademarks HYTREL, and BEXLOY V, from Eastman Chemical Products under the trademark ECDEL, from Hoechst Celanese under the trademark RITEFLEX, and from the General Electric Company under the trademark LOMOD. If and when employed, the total amount of additives (including impact modifier and/or elastomer) present in a thermoplastic resin employed in the practice of this invention is usually less than about 15 weight percent based on the total weight of thermoplastic resin plus additive(s).

Reinforcing Fibers

Suitable reinforcing fibers adapted for use in the practice of this invention include those comprised of carbon, (including graphite) aramid, glass, quartz, silicon carbide, ceramic, metal coated carbon, metal (such as stainless steel, boron, copper, nickel, and the like), mixtures thereof, and the like. Such fibers are generally available from various suppliers. Presently preferred such fibers include carbon, glass, and aramid.

The diameter of the reinforcing fibers typically ranges from about 10 to 500 microns, but larger and smaller diameter fibers can be used. A present preference is to employ reinforcing fibers having average diameters in the range from about 20 to 100 microns.

For reasons of maximum strength properties, substantially continuous fibers are preferred when woven fabric and unidirectional fibers are employed for fiber reinforcement in starting prepregs having ordered fiber arrangements. In starting prepregs having random reinforcing fiber arrangements, continuous fibers are preferred for strength reasons in those prepregs having an incorporated (impregnated with resin) fiber mat or equivalent. However, discontinuous reinforcing fibers can be used in such prepregs, and, when used, such fibers preferably have an average length of at least about 1 inch. Broadly, reinforcing fibers having a length down to about ⅛ inch (0.3 centimeter) can be employed. Preferably, the average length of randomly arranged or ordered discontinuous fibers used in a prepreg is at least about 10 times the average diameter thereof, and is more preferably at least about 15 times the average diameter thereof, although higher and lower minimum diameter to length ratios can be employed without departing from the spirit and scope of the invention. The term "diameter" as those skilled in the art will appreciate, refers to the width dimension of fiber and such width dimension need not be cross-sectionally circular. In practice the cross-sectionally circular. In practice the cross-sectionally fiber configuration can be of widely varying form such as elliptical, rectangular, etc. Hence, in estimating a diameter, an average value is taken for reasons of technical accuracy.

The fibers, whether spatially oriented in an ordered or random configuration, may themselves sometimes be "oriented" in the forming thereof as is known in the art to produce molecular or crystalline "orientation".

Wall Portion Preparation

For purposes of the present invention, as wall portion is first conveniently and conventionally prepared by laminating together at least one, preferably at least two prepregs of the first type above indicated. The prepregs are arranged interfacially in a first stack preliminarily. The stack arrangement and ordering is, of course, a matter of user choice, but usually the prepregs comprising the stack are arranged to provide a maximized strength suitable for the end use application intended, as those skilled in the art well appreciate. For example, the unidirectionally extending fibers of one prepreg layer could be arranged normally relative to the unidirectionally extending fibers in adjacent layers on either side of such one prepreg, or the like, as desired or chosen.

The stack is positioned between a pair of spaced, preferably (but not necessarily) parallel molding surfaces, and the mold is closed with the molding surfaces being applied against opposed outside faces of the stack. The molding surfaces are maintained at a temperature which is at least sufficient to heat fuse together contacting surface portions of the thermoplastic resin present in the prepregs. A pressure is simultaneously applied against such opposing stack faces which is at least sufficient to compress said first prepregs to a predetermined extent. Such temperature and pressure are concurrently applied for a time which is at least sufficient to heat fuse said first prepregs together and form the desired wall portion which characteristically and preferably (but not necessarily) has spaced, parallel opposed surfaces or faces. Thereafter, the mold surfaces are cooled and separated, and the wall portion separated from the mold.

Thereafter, if desired, the thus formed wall portion can be subjected to a thermoforming operation wherein the surfaces of the wall portion are relatively mildly contoured into a three dimensional configuration with the aid of heat and pressure in a conventional thermoforming apparatus so as to produce a desired shaped body having predetermination profile(s). In such a profile, the deviations introduced from the initial plain or flat state of the starting "blank" wall portion is typically relatively small, since care needs to be taken in the thermoforming operation to avoid the application of forces upon the starting wall portion being thermoformed which are sufficient to damage or even rupture the continuous reinforcing fibers present in the structure of the starting blank wall portion, such as fiber elongation (and weakening or breaking) or ordered fiber disruption (such as a spreading apart transversely of longitudinally extending unidirectional fibers or woven fibers, or the like).

Either during such a thermoforming operation itself, or subsequently in a separate operational step, apertures may be cut, if desired, in the formed structure, such as rivet or like fastening holes, portholes or like window openings, or structurally modifying excisions may be made (for fitting a wall member into a subsequent end use environment), or the like, as desired. The cutting can be accomplished manually (as when custom, one-of-a-kind structures are being produced), or by cutting dies in a press arrangement (as when production of a plurality of like structures is being undertaken, as for repetitive installation and ultimate use in a large vehicle or the like), or otherwise as desired.

After preparation, a wall portion can be interveningly stored or moved before being used further in accord with the teachings of the present invention. For example, wall portions can be made at one location and moved to another location for association with frame portion(s) in accord with the present invention.

In addition to thermoforming, a flat composite comprising a blank or precursor wall portion, can be contour formed by other known procedures. For example, contouring can be accomplished by:

(a) autoclave forming
(b) diaphragm forming as described in "Effect of Forming Temperature on the Properties of Polymeric Diaphragm Formed Components", C. M. O'Bradaigh and P. J. Mallon, submitted to the ASCM/CCM Joint Symposium on Composite Materials Science and Engineering (1987);
(c) hydroforming as described in article "Advanced Manufacturing of Thermoplastic Composites" by Kueterman, pages 147–154, Advanced Composites Conference Proceedings, copyright 1985, and the like.

Wall portion preparation conditions typically involve pressures ranging from about 25 to 5,000 pounds per square inch and resin temperatures of from about 250° to 900° F. applied for times ranging from about 1 minute to 1 hour. Choice of conditions is dependent upon the thermoplastic resin employed and other factors. For example, when a polyphenylene sulfide resin is employed in the prepregs, the temperatures employed can range from about 550° to 700° F., preferably 600°–650° F., the pressures can range from about 25 to 1000 psi, preferably 100–150, and the times can range from about 1 min. to 1 hour.

FRAME FORMATION AND ASSOCIATION WITH WALL PORTION

Next, a second stack of prepregs is laid up on at least one predetermined location against at least one of the wall surfaces of the so-prepared wall portion. Such second stack is comprised of at least one second prepreg, with preferably at least two such prepregs being interfacially associated and used when the frame contemplated for creation is to project prominently outwardly from an associated surface of the wall portion, and yet also have a transversely extending thickness sufficient for the particular structural purposes desired. The second stack in general has prechosen exterior dimensions.

A configuration-defining mold means is positioned exteriorly around outside surface portions of said second stack and also against the other (opposed) side of such wall surfaces at such predetermined location. The interrelationship between such second stack and such configuration-defining mold means is such that, when said configuration-defining mold means is pressurized to a predetermined extent perpendicularly relative to said wall portion, such second stack is consolidated and defines the desired such frame portion. It can be regarded as a feature of the present invention that the second stack of prepregs as initially cut and placed does not have to have an exterior configuration which is precise since the mold formation pressures are such that the prepregs are conformed into the configuration desired.

Once such prepreg lay up and such mold means positioning is completed, the configuration-defining mold means is compressed perpendicularly relative to such wall portion with said prechosen pressure (or greater or smaller if desired). Such configuration-defining mold means is preferably preheated to a predetermined temperature. The prechosen temperature and the prechosen pressure are applied to the second stack at such location for a time at least sufficient to allow for heat fusion to take place between said second prepregs and also to such wall surfaces at such locations, thereby to produce simultaneously both said frame portion and also said composite structure.

The configuration-defining mold means is then removed and separated from the assembly to leave the desired fabricated integrally formed structural composite.

In one preferred mode of practicing the process, the frame portion is derived from at least about five second prepregs which are thermally interfacially bonded together. Preferably, the frame portion includes an upstanding frame member which projects outwardly from the wall portion a distance which is at least about five times the thickness of the wall portion. Preferably, such a frame portion further includes a laterally enlarged base member whose cross-sectional area taken parallel to such wall portion is at least about four times the correspondingly taken average cross-sectional area of such upstanding frame member. Such base member includes a bottom face which is substantially completely thermally bonded to such one face of such wall portion at such location.

In one preferred mode of practicing the invention, the first prepregs used in forming the wall portion have reinforcing fibers arranged unidirectionally therein, while the second prepregs used in forming the frame portion(s) have reinforcing fibers randomly arranged in a nonwoven mat therein. Similarly, in another preferred mode of practicing the invention, the first prepregs used in forming the wall portion have reinforcing fibers arranged in a woven fabric therein, while the second prepregs used in forming the frame portion(s) have reinforcing fibers which are substantially continuous and which are randomly arranged in a nonwoven mat therein.

Sometimes, herein the term "flattened" is used in characterizing a wall portion. The term "flattened" is used to indicate the fact that a wall portion has generally, but not necessarily, spaced parallel opposing wall surfaces which are not necessarily flat, but indeed may typically be curved or curving so that a wall portion when looked upon in end view or edge wise displays a three-dimensional contour or curvature. Thus, the term "flattened" does not mean planar herein and is distinct from, for example the term "flat".

Similarly, the term "frame" is used herein to embrace all three-dimensional projections or ribs which can be heat laminated to a wall portion. Thus, the term "frame" is inclusive of various functional components or projections including supports, ribs, projections, joints, brackets, flanges, platforms, and the like, as those skilled in the art will appreciate.

Conditions employed for frame portion formation and integral association with wall portion typically involve pressures ranging from about 1000 to 60,000 pounds per square inch, tool (or mold) temperatures ranging from about 250° to 900° F. and times ranging from about 1 minute to 3 hours. Choice of conditions is dependent upon the thermoplastic resin employed and other factors. For example, when a polyphenylene sulfide resin is employed in the prepregs, the tool (or mold) temperatures employed can range from about 250° to 400° F., the pressures can range from about 2500 to 15,000 psi, and the times can range from about 1 to 30 minutes. As in the case of the combination of conditions employed in wall portion formation (see above), the heat/pressure/time relationship is chosen so as to be at least great enough to carry out heat fusion of the thermoplastic resin at all contacting locations, but not great enough to achieve in the thermoplastic resin a level of fluidity such that a disruption or change occurs in the product structural composite in relation to the starting interrelationship or distribution of reinforcing fibers in the starting prepreg. For instance, in the product structural composite, the reinforcing fibers are preferably distributed throughout the composite; preferably, there are no areas where the resin has collected or flowed and separated from the fibers. The combination of conditions is such that the starting composition of the thermoplastic resin has preferably not undergone degradation, although it is common for the combination of conditions to cause some thickening and cross-linking of the thermoplastic resin which in some instances is desired by users of prepregs. In general, the achievement of a particular combination of heat, pressure, and time is selected through a brief trial or test program for a given product structural composite, as those skilled in the art will readily appreciate. The availabilty and widespread use of the contemporary commercially available press structures has made possible a wide range of composite forming conditions with usage of significant variations in each of time, mold temperature, and mold pressure from one part formation to another.

THE MOLD STRUCTURE

The configuration-defining mold structure provided by this invention for the fabrication of integrally formed structural composites can be regarded as being comprised of three components.

One component is a base member which has a generally smooth working surface defined therein whose topographical surface characteristics on areas thereof to be used for object forming purposes mirror the surface characteristics desired on wall portions of an integral composite structure desired.

A second component is a top member having the reverse exterior configuration of a desired frame structure defined in a working surface thereof provided that all cavities thus defined therein have side walls which are at an angle of less than 90° with respect to the adjacent horizontal surface portions of said working surface thereof.

A third component is a spacing means adapted for being positioned around a prechosen perimeter of the desired frame structure to be formed and between the base member and the top member. The third component in particular can be comprised of more than one member for reasons of ease of fabrication and/or use, as those skilled in the art will appreciate, but one member is presently preferred for use as the third component.

These mold components are generally formed of metal, preferably steel or the like, by machining or the like.

Depending upon the application involved, the base member can be classified as being either one of two types. In one type, the base member has a size sufficient to exceed the perimeter of the wall portion, so that, for example, if desired, the perimeter of the base member can incorporate an upstanding flange, or the like, thereby defining a pocket or flattened recess adapted to receive therein the entire base member. Such a base member can be desirable in use in various situations, such as in testing and evaluation, and in situations where precise component positioning is desired, and the like.

In the other type, the base member has a size which is insufficient to reach the perimeter of the wall portion. Indeed, the base member may be so small relative to the total size of the wall portion as to occupy only the specified location area intended for use in creating the frame portion plus a small additional circumferential area. With this type of base member, an associated working framework is necessary in order to position such base member accurately at the specified location on one side of the wall portion while permitting the positioning of the top member and the spacing component(s) accurately on the opposing side of the wall portion in a desired registration relationship therebetween so that the molding temperatures and pressures can be applied as desired to form the frame member and to heat bond such to the wall portion concurrently.

Particularly in the case where the structural composite product being formed has a contoured wall surface in the region where the frame portion(s) are to be formed and integrally associated with the preformed wall portion, it is necessary to make mold components which have working surfaces which are curved to mate with the curvatures involved. It can be regarded as one of the advantages of the present invention that the frame portion(s) can be formed even when relatively significant wall portion curvatures are locally involved at the location or site of frame portion association by using only melt fusion temperatures and formation pressures applied approximately perpendicularly relative to the wall portion at such location of frame portion formation (or perpendicularly to the projecting frame member being formed in a frame portion).

FIGURE DESCRIPTION

Referring to FIG. 1, there is seen an isometric view of one embodiment of a structural composite produced in accordance with the teachings of the present invention which is herein designated in its entirety by the numeral 20. The embodiment 20 incorporates a wall portion 21 and a frame portion 22. The frame portion 22 and the wall portion 21 are integrally associated with one another to provide a one-piece, integral, laminated structural composite. In this structure, the wall portion of 21 is generally continuous and generally flattened; however, the frame portion is three-dimensional with the frame portion 22 being associated with a limited region 23 of the wall portion 21.

The wall portion 21 is comprised of at least two interfacially thermally bonded first prepregs (such first prepregs having been hereinabove described). In the present situation, each such first prepreg is shown to have a fiber reinforcement which is comprised of continuous woven glass fibers. The appearance of one surface of the wall portion 21 is illustrated by the enlarged circular magnified view 24. The resin-covered, slightly raised areas on the surface 26 of wall portion 21 are observable. In this embodiment, each of the first prepregs, in general, comprises a thermoplastic resin matrix which is impregnated with substantially continuous reinforcing fibers which are arranged in an ordered array.

The appearance of surface portions of the frame portion 22 is illustrated by the circular magnification view 25 which illustrates the appearance of the flattened upper surface of the base member 28 under magnification. In this embodiment, the second prepregs used to form the frame portion 22 are here comprised of continuous, randomly arranged reinforcing fibers which are observable as resin covered slightly raised areas in the surface of the frame portion 22.

The frame portion 22 is here comprised of at least one second prepreg. The frame portion 22 includes an upstanding frame member 27 which projects outwardly from the face 26 of the wall portion 21. The frame portion 22 further includes a generally flattened base member 28 which is formed with the frame member 27 and is integrally associated therewith. The base member 28 includes a bottom face (not shown in FIG. 1) which is substantially completely thermally bonded to the location 23 on face 26 of wall portion 21.

The embodiment 20 is formed by the technique or process herein describe. The composition of the thermoplastic resin and of the reinforcing fibers is herein above explained. In the embodiment 20, the frame portion 22 is preferably comprised of at least 2 interfacially thermally bonded second prepregs, and more preferably of at least 5 interfacially bonded second prepregs. The frame portion 22 typically can project if desired outwardly from the wall portion 21 by a distance which is at least about 5 times the thickness of the wall portion 21. The flattened base member 28 is positioned between the upstanding frame member 27 and the wall portion 21. The base member 28 has a cross sectional area taken parallelly to the wall portion 21 which is at least about 4 times the correspondingly taken average cross-sectional area of the upstanding frame member 27. The bottom surface of the flattened base member 28 comprises the bottom face thereof.

Figure 5:
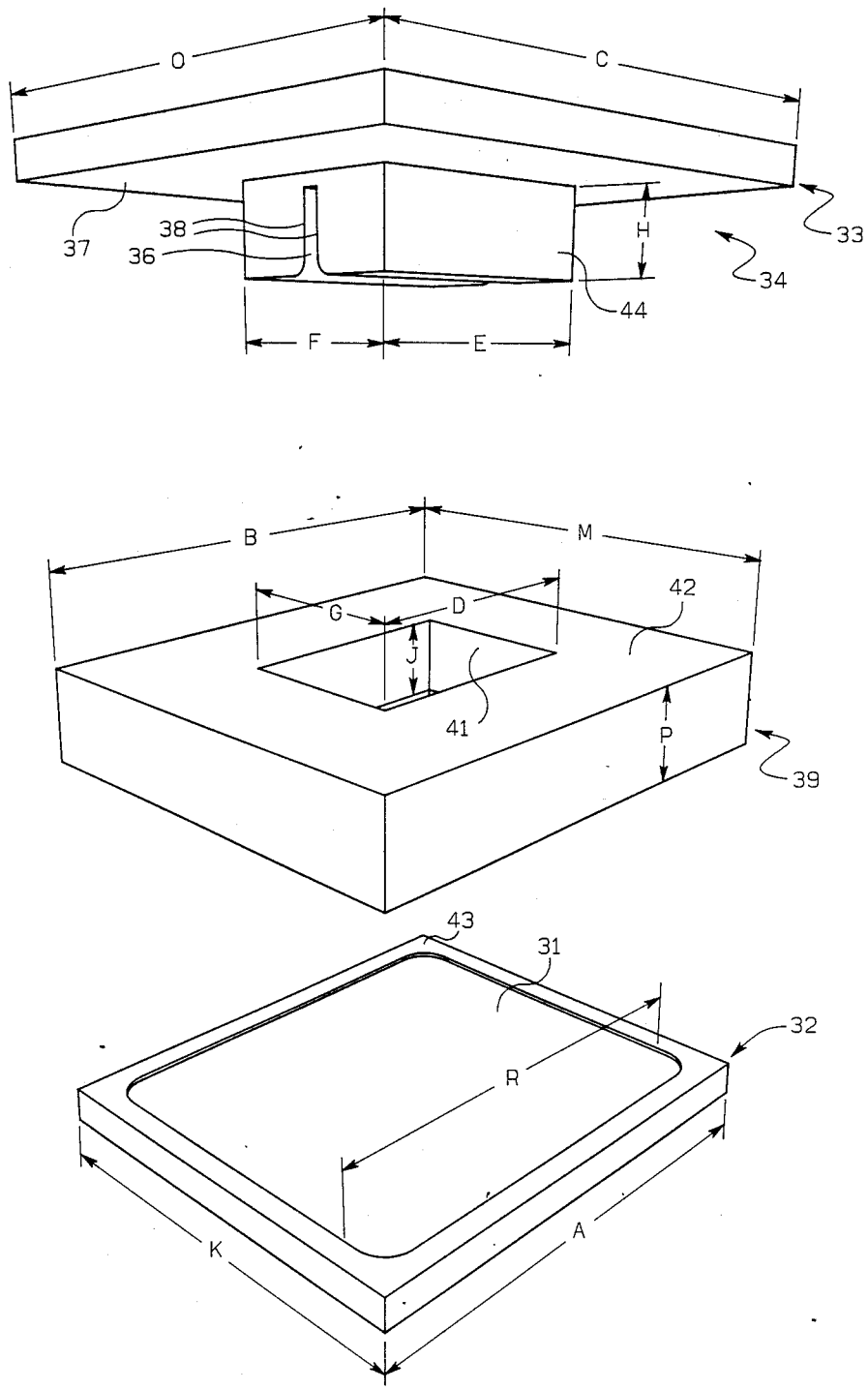
FIG. 5 is an exploded perspective view of the mold assembly of FIG. 2.

To prepare embodiment 20, the wall portion 21 is first prepared by laminating together the first prepregs. Thereafter, the wall portion 21 is positioned in the depressed central area or well 31 of a mold base member 32 as shown in FIG. 5. In fact, if desired, as a matter of preparation convenience, the wall portion 21 can be formed, if desired, by positioning appropriately presized first prepregs in the well 31 and conventionally applying thereagainst the opposing face of a stamp mold mating member (not shown), as those skilled in the art will appreciate. The bottom face of the well 31 has a generally smooth and flat working surface defined therein, as shown, for example, in FIG. 5.

In addition to base member 32, the mold structure 29 (see FIG. 2) further includes a top mold member 33 which member 33 has a reverse exterior working surface configuration generally designated by the numeral 34 in which the reverse or mirrored surface portions desired for a frame portion 22 are defined. All cavities, such as cavity 36 in projection 44 of surface 34, which cavity 36 has sidewalls 38, extend at an angle which is less than about 90 degrees with respect to the adjacent horizontal surface portions, such as portions 37 of the working surface 34; otherwise, as those skilled in the art will appreciate, the mold top member 33 cannot be separated from a wall portion 21 formed therewith.

In addition, the mold structure for forming the frame portion 22 includes spacing member means which in the three component mold structure 29 is provided by the spacer block 39. The spacer block 39 is adapted for positioning around a prechosen perimeter for the frame structure for frame portion 22 with such prechosen perimeter being defined by the rectangular aperture 41 defined in the spacer block 39.

In addition, the transverse thickness designated by the letter P in spacer block 39 is chosen so as to provide a height approximately corresponding to the height of the frame member 27 in the frame portion 22 with opposed faces 42 (the bottom face not being shown) of the spacer block 39 being adapted for positioning between the horizontal surface portions 37 of the top member 33 and the horizontally extending rim surface portions 43 of the base member 32.

The vertical height of those portions of top member 33 which define the frame member 27 and the upper face of the base member 28 have a vertical distance or height designated by the letter H which is shorter than the vertical distance P and J associated with the transverse thickness of the spacer block 39. By these dimensional considerations, and as desired, the top member 33 during formation of a frame portion 22 therewith does not completely become fully nestably received within the spacer block 39, so that, for example, the rim portion of top member 33 does not engage the rim portion of the adjacent spacer block 39, thereby permitting, during the formation of the frame portion 22 with heat and pressure, the continuing application and maintenance of a desired level of pressure upon the forming frame portion 22 through the use of pressure perpendicularly applied against the outside face of the mold top member 33 and the outside bottom face of the mold base member 32.

Figure 3:
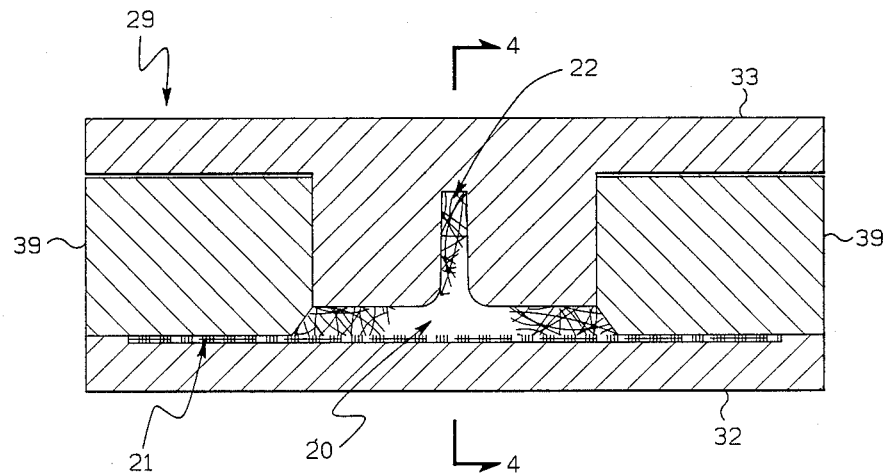
FIG. 3 is a vertical sectional view taken along the line 3—3 of FIG. 2.
Figure 4:
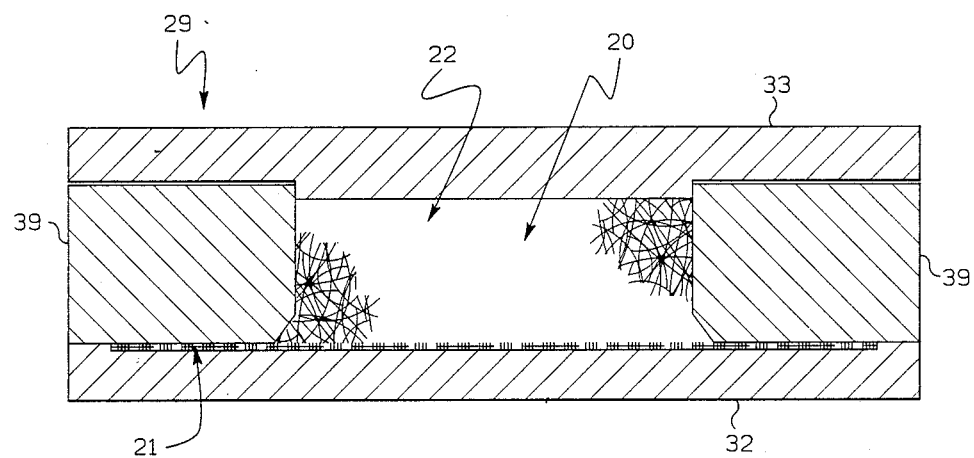
FIG. 4 is a vertical sectional view taken along the line 4—4 of FIG. 3.

Referring to FIGS. 3 and 4, there is seen the appearance of the embodiment 20 during its formation in the three component mold structure 29. The diagrammatic lines associated with, respectively, the wall portion 21 and the frame portion 22 illustrate the circumstance that the frame portion 22 is formed of randomly arranged fibers while the wall portion 21 is formed with ordered fibers.

Figure 2:
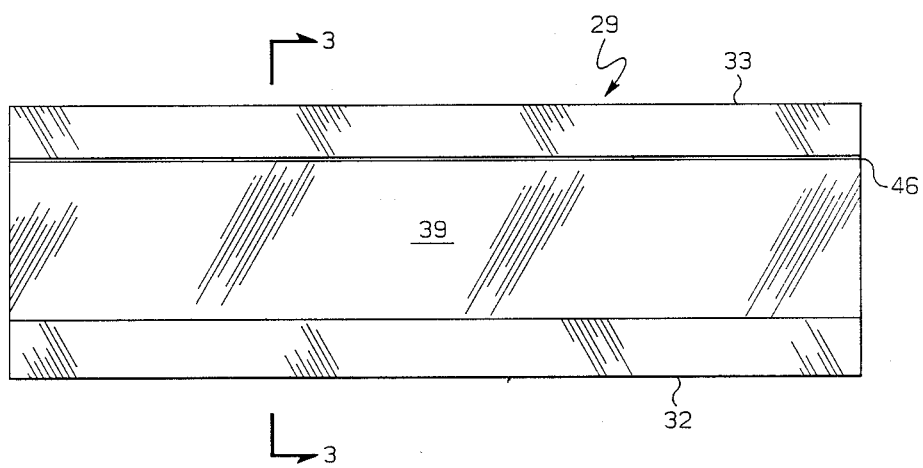
FIG. 2 is a side elevational view of one embodiment of an assembled three-component mold assembly adapted for use in the making of the composite of FIG. 1.

The assembled configuration of the three component mold structure 29 is shown or illustrated in FIG. 2 wherein the spacer block 39 rests in the desired assembled relationship on top of the working surface of the mold base member 32 while the mold top member 33 is nestably received within the block 39. Typically, in the assembled configuration, the opposing surface of the mold top member 33 in relation to the adjacent surface of the spacer block 39 is spaced slightly as shown by the space 46 shown in FIG. 2.

Figures 6, 7:
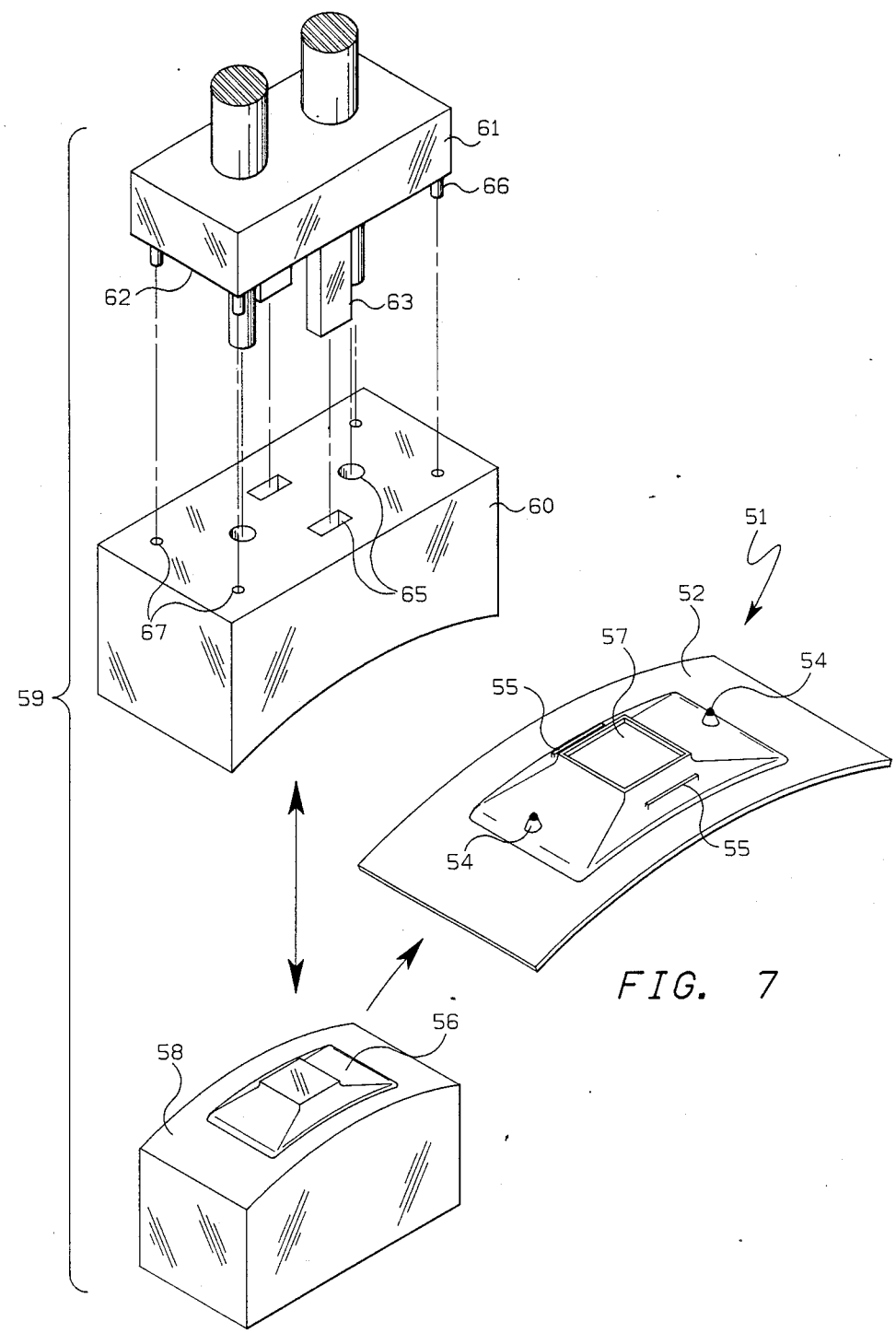
FIG. 6 is an exploded perspective view of a mold assembly adapted for positioning in any press such as a Lawton Press Model 300 Ton for use in making a three-dimensional structural composite of the present invention.
FIG. 7 is a perspective view of one embodiment of a three-dimensional structural composite of the present invention.

Referring to FIG. 7, there is seen a perspective view of one embodiment of a three-dimensional structural composite produced in accord with the teachings of the present invention. The embodiment 51 shown here is a sidewall panel of an aircraft interior, and includes a wall portion 52 and various frame portions, identified as 54 and 55, respectively, all frame portions being integrally bonded to the wall portion 52.

The side wall panel 51 is made by the following procedure. First, a flat blank for a wall portion 52 is prepared by laminating together with heat and pressure at least two prepregs of the first type. Next, the blank is thermoformed into the three dimensional, contoured configuration generally shown in FIG. 7. Either during the thermoforming operation, or, subsequently, in a separate operation, such as a die cutting operation, a window aperture 57 is cut in the crown region of the thermoformed wall portion 52. Thereafter, the resulting thermoformed wall portion 52 is positioned on the base member 58 as shown in FIG. 6 of a three piece mold assembly 59, such base member 58 having a working surface 56 that is adopted to accommodate and match the concave surface of the wall portion 52.

The spacer block 60 of assembly 59 is then positioned over wall portion 52 and base member 58. The charge wells 65 defined in spacer block 60 are then each charged with pre-cut prepregs of the second type. Thereafter, the top member 61 of assembly 59 is closed against spacer block 60 with the projections 63 on the working surface 62 of top member 61 coming into mating engagement with the charge well 65. Locating pins 66 on surface 62 engage receiving holes 67 in spacer block 60 for guiding top member 61 relative to spacer block 60 during mold assembly 59 opening and closing operations in the press (not shown). After the compressing together in registration of the mold elements 61, 60 and 58 at elevated temperature and pressure for the desired time, the mold assembly 59 is opened and the finished embodiment 51 removed.

EXAMPLES

A further understanding of the present invention can be obtained by reference to the following specific examples which are provided herein for purposes of illustration only and are not intended to be limiting unless otherwise specified.

EXAMPLE 1

To produce for study, test and evaluation purposes an embodiment of the invention such as shown in FIG. 1, a mold assembly such as shown in FIGS. 2 and 5 was made, and such mold assembly had the following dimensions (referring to the alphabetical reference letters marked in FIG. 5):

| Reference Letter | Dimension | |
| --- | --- | --- |
| | inches | centimeters |
| A | 11.88 | 30.18 |
| B | 11.88 | 30.18 |
| C | 15.00 | 38.10 |
| D | 3.55 | 9.02 |
| E | 3.53 | 8.97 |
| F | 2.48 | 6.30 |
| G | 2.49 | 6.32 |
| H | 2.68 | 6.81 |
| J | 2.89 | 7.34 |
| K | 12.00 | 30.48 |
| M | 12.00 | 30.48 |
| O | 11.88 | 30.18 |
| P | 2.89 | 7.34 |
| R | 6.00 | 15.24 |

The mold was fitted with U-shaped centering and securing means attached to opposing sides of the respective base and top sections 32 and 33 for aligning and for associating therewith the center section or spacer block 39. The top section 33 was joined to the center section 39 on opposing sides by means of a pair of flexible elbows. Extension of the elbows separated the top and center sections with sufficient distance or spacing to permit placement of starting prepregs into the center mold section 39 and to permit removal of molded embodiments 20 therefrom. Each section of the mold was fitted with one-half inch diameter holes for positioning in each hole a 1,000 watt electrical "Watlow" cartridge heater for maintaining a desired temperature. The mold assembly was adopted for positioning in a Lawton press Model No. 300 Ton.

EXAMPLE 2

Using the mold of Example 1 positioned in a 300 ton Lawton Press Model No. 300 Ton, the base section 32 was heated to 420° F., the spacer block 39 was heated to 350° F., and the top member 33 was heated to 325° F.

A 6 inch (15.24 centimeter) by 6 inch (15.24 centimeter) by 0.06 inch (0.15 centimeter) composite is prepared as a wall portion by laminating together 5 prepregs. Each of these prepregs comprises a polyphenylene sulfide impregnated carbon fiber fabric prepreg (constituting a first prepreg type as such terminology is described and defined herein). Such prepreg is available commercially under the trade designation "RYTON PPS Advance Composite AC32-60" from Advanced Composites division of Phillips 66 Company, Bartlesville, Okla. 74004. For making this flat composite, the following formation conditions were used: Pressure - about 100 psi, temperature (preheated mold) -about 625° F., time - about 6 minutes.

Concurrently, seven layers of a second prepreg type as such terminology is described and defined herein were prepared. The prepreg used is available commercially under the trade designation "RYTON PPS Advance Composite AG20-40" from Advanced Composites division of Phillips 66 Company, Bartlesville, Okla. 74004 and which is polyphenylene sulfide impregnated with continuous, randomly arranged glass fibers, are prepared. Each layer measured 3.50 inches (8.89 centimeter) by 2.50 inches (6.35 centimeters) by 0.06 inch (0.15 centimeter). All layers were preheated in an infrared oven at 840° F. for 2 minutes. This preheating caused the fibers in each prepreg piece to relax from the initial compressed configuration resulting in a thickening (or swelling or lofting) of the individual prepreg pieces from their initial thickness of about 2 millimeters to a final thickness of about 7 millimeters each. The so preheated and lofted prepreg pieces are stacked interfacially on top of one another and deposited in the center section or spacer block 39 central aperture 41 with the block 39 being located in place on the base member 32. The top member 33 was then closed against the spacer block 39 in registration and a pressure was perpendicularly applied against the opposing faces of the assembled mold assembly 29 of 30 tons for 5 minutes time. The mold assembly 29 was then opened and the integrally formed wall portion and frame portion comprising embodiment 20 was removed.

In the product embodiment, the frame portion was found to be well formed and to be fiber reinforced throughout its structure. The frame portion was bonded at its base uniformly to the wall portion.

EXAMPLE 3

The procedure of Example 2 is repeated except that in place of the "RYTON PPS Advance Composite AG20-40" prepreg material which is likewise commercially available from the same source and which is polyphenylene sulfide impregnated with randomly arranged glass reinforcing fibers of about 1 inch in average length. The preheating time for these mat prepreg pieces was 0.83 minutes in the infrared oven. All other processing conditions were unchanged.

In the product embodiment, the frame portion was found to be well formed and to be fiber reinforced throughout its structure. The frame structure was bonded at its base uniformly to the wall portion.

EXAMPLE 3

The procedure of Example 2 is repeated except that in place of the "RYTON PPS Advance Composite AG20-40" prepreg material there was substituted the "RYTON PPS Advancec Composite AC10-20" prepreg material which is likewise commercially available from the same source and which is polyphenylene sulfide impregnated with randomly arranged glass reinforcing fibers of about 1 inch in average length. The preheating time for these mat prepreg pieces was 0.83 minutes in infrared oven. All other processing conditions were unchanged.

In the product embodiment, the frame portion was found to be well formed and to be fiber reinvorced throughout its structure. The frame structure was bonded at its base uniformly to the wall portion

ILLUSTRATIVE EXAMPLE 4

The following examples are intended to be illustrative of the practice of the invention using prepregs similar to those above exemplified, but comprised of alternative thermoplastic resins within the scope of the present invention.

Prepregs of each of the first type and of the second type are commercially obtained which are based upon each of the following trademarked thermoplastic resins:
1. polyetheretherketone from ICI Amercias
2. polyether sulfone from ICI Amercias
3. polyamide imide from Amoco Performance Products
4. polyether ketone from ICI Americas
5. polyether imide from General Electric Company
6. polyarylsulfone from Amoco Performance Products Using the procedure generally described in Example 2, but employing pressures ranging from about 2500 to 60,000 psi and temperatures ranging from about 200° to 600° F., a series of structural composites are prepared using such first and second prepreg types.

Each product structural composite is found to achieve good thermal bonding between the wall portion and the frame portion, and each frame portion is acceptable and has substantially uniform fiber reinforcement.

Having now fully described the invention, it will be apparent to one of ordinary skill in the art that many changes and modifications can be made thereto without departing from the spirit or scope of the invention as set forth herein.

That which is claimed is:

1. A process for fabricating an integrally formed structural composite comprised of a generally flattened wall portion and at least one three-dimensional frame portion, said wall portion being derived from at least one first prepreg, and said frame portion being derived from at least one second prepreg, each of said first prepregs comprising a thermoplastic resin matrix which is impregnated with substantially continuous reinforcing fibers which are arranged in an ordered array in such first prepregs, said at least one second prepreg comprising a thermoplastic resin matrix which is impregnated with reinforcing fibers which are at least about ⅛ inch in average length and which have an average diameter to length ratio which are at least about 1:10, said reinforcing fibers being randomly arranged in such second prepreg, said thermoplastic resin being selected from the resin group consisting of:
polyarylene sulfides,
polyethers,
polyketones,
polysulfones,
polyamides,
polyimides,
polyamideimides,
polyetherimides
polyesters,
polycarbonates, and acetal resins,
said reinforcing fibers being comprised of a material selected from the group consisting of:
carbon,
aramid,
glass,
quartz,
silicon carbide,
ceramic,
metal coated carbon, and
metal,
said process comprising the steps of:
(A) laminating together a first stack of prepregs positioned between a pair of spaced, generally parallel molding surface means applied against opposing outside faces of said first stack, said first stack comprising said at least one first prepreg interfacially arranged, said laminating being carried out while said molding surface means:
 are maintained at a temperature which is at least sufficient to heat fuse together contacting surface portions of said thermoplastic resin,
 apply a pressure against opposing outside faces which is at least sufficient to compress said first prepregs to a predetermined extent,
said temperature and said pressure being concurrently applied for a time which is at least sufficient to heat fuse said first prepregs together,
thereby to form said wall portion, said wall portion having generally spaced, parallel, opposed surfaces,
(B) laying up a second stack of prepregs on a predetermined location against one of said wall surfaces, said second stack being comprised of said at least one second prepreg, said second stack having prechosen exterior dimensions, and positioning configuration-defining mold means exteriorly around outside surface portions of said second stack and also against the other of said wall surfaces at said predetermined location, the interrelationship between said second stack and said configuration-defining mold means being such that, when said configuration-defining mold means is pressurized to a predetermined extent perpendicularly to said wall portion, such second stack is consolidated and defines said frame portion, and
(C) compressing said configuration-defining mold means perpendicularly relative to said wall portion with a prechosen pressure, said configuration-defining mold means being heated to a prechosen temperature, and maintaining said prechosen pressure and said prechosen temperature for a time at least sufficient to heat fuse together said second prepregs to one another and to said wall surfaces at said location, thereby to produce simultaneously said frame portion and also said integral composite structure.

2. A process of claim 1 wherein said reinforcing fibers in said second prepreg are at least about 1 inch in average length and have a diameter to length ratio of at least about 1:15.

3. A process of claim 1 wherein said frame portion is derived from at least about two second prepregs which are thermally interfacially bonded together.

4. A process of claim 1 wherein said frame portion is derived from at least about five second prepregs which are thermally interfacially bonded together.

5. A process of claim 1 wherein said frame portion includes an upstanding frame member which projects outwardly from said wall portion a distance which is at least about five times the thickness of said wall portion, further includes a laterally enlarged base member whose cross-sectional area taken parallelly to said wall portion is at least about four times the correspondingly taken average cross-sectional area of said upstanding frame member, said base member including a bottom face which is substantially completely thermally bonded to said one face of said wall portion at said location.

6. A process of claim 1 wherein, in said first prepregs, said reinforcing fibers are arranged unidirectionally, and wherein, in said second prepregs, said fibers are arranged in a nonwoven mat.

7. A process of claim 1 wherein, in said first prepregs, said reinforcing fibers are arranged in a woven fabric comprised thereof, and wherein, in said second prepregs, said fibers are substantially continuous and are arranged in a nonwoven mat.

8. A process of claim 1 wherein said thermoplastic resin comprises a polyarylene sulfide selected from the group consisting of polyphenylene sulfide, polyphenylene sulfide ketone, polyphenylene sulfide sulfone, poly biphenylene sulfide, and mixtures thereof, and said reinforcing fiber is selected from the fiber group consisting of carbon fibers, glass fibers, and aramid fibers.

9. A process of claim 1 wherein said thermoplastic resin comprises a polyether selected from the group consisting of polyarylethers, polyether ketones, polyetherether ketones, polyether diketones, polyether sulfones, and polyether imides, and said reinforcing fiber is selected from the fiber group consisting of carbon fibers, glass fibers, and aramid fibers.

10. A process of claim 1 wherein between said step (A) and said step (B), said wall portion is contoured.

* * * * *